United States Patent
Da et al.

(10) Patent No.: US 11,388,689 B2
(45) Date of Patent: Jul. 12, 2022

(54) TIMING ADVANCE INDICATION METHOD, BASE STATION, UE AND DEVICE

(71) Applicant: CHINA ACADEMY OF TELECOMMUNICATIONS TECHNOLOGY, Beijing (CN)

(72) Inventors: Ren Da, Beijing (CN); Zheng Zhao, Beijing (CN); Bin Ren, Beijing (CN); Tony Ekpenyong, Beijing (CN); Pierre Bertrand, Beijing (CN); Fangchen Cheng, Beijing (CN); Tie Li, Beijing (CN); Qiubin Gao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 184 days.

(21) Appl. No.: 16/646,116

(22) PCT Filed: Aug. 30, 2018

(86) PCT No.: PCT/CN2018/103267
§ 371 (c)(1),
(2) Date: Mar. 10, 2020

(87) PCT Pub. No.: WO2019/047766
PCT Pub. Date: Mar. 14, 2019

(65) Prior Publication Data
US 2020/0275398 A1   Aug. 27, 2020

(30) Foreign Application Priority Data

Sep. 11, 2017   (CN) .......................... 201710814522.9
Oct. 27, 2017   (CN) .......................... 201711030294.2

(51) Int. Cl.
*H04W 56/00* (2009.01)
*H04L 5/00* (2006.01)
*H04W 74/08* (2009.01)

(52) U.S. Cl.
CPC ......... *H04W 56/0045* (2013.01); *H04L 5/001* (2013.01); *H04L 5/0094* (2013.01);
(Continued)

(58) Field of Classification Search
None
See application file for complete search history.

(56) References Cited

U.S. PATENT DOCUMENTS

2014/0348122 A1   11/2014   Li et al.
2015/0003427 A1   1/2015   Wan et al.
(Continued)

FOREIGN PATENT DOCUMENTS

CN   101267419 A   9/2008
CN   102036359 A   4/2011
(Continued)

OTHER PUBLICATIONS

Extended European Search Report from EP app. No. 18854160.1, dated Oct. 13, 2020.
(Continued)

*Primary Examiner* — Saad Khawar
(74) *Attorney, Agent, or Firm* — Ladas & Parry, LLP

(57) ABSTRACT

A timing advance indication method, a base station, a terminal and a device are provided. The method includes: transmitting subcarrier spacing configuration information of a physical uplink shared channel and/or a physical uplink control channel to a terminal; receiving a preamble fed back by the terminal based on subcarrier spacing configuration information; obtaining a quantized value of a timing advance corresponding to a tracking area based on the
(Continued)

preamble; and transmitting the quantized value of the timing advance to the terminal.

18 Claims, 3 Drawing Sheets

(52) U.S. Cl.
CPC ... *H04W 56/0005* (2013.01); *H04W 56/0055* (2013.01); *H04W 74/0833* (2013.01)

(56) References Cited

U.S. PATENT DOCUMENTS

| | | | |
|---|---|---|---|
| 2015/0146631 A1 | 5/2015 | Kim et al. | |
| 2017/0019905 A1 | 1/2017 | Ko et al. | |
| 2017/0201958 A1* | 7/2017 | He | H04W 72/0413 |
| 2017/0303224 A1 | 10/2017 | Choi et al. | |
| 2019/0356460 A1* | 11/2019 | Tsuboi | H04W 28/18 |
| 2021/0235406 A1* | 7/2021 | Liu | H04L 27/2607 |

FOREIGN PATENT DOCUMENTS

| | | |
|---|---|---|
| CN | 102497347 A | 6/2012 |
| CN | 102647783 A | 8/2012 |
| CN | 103209459 A | 7/2013 |
| CN | 103298136 A | 9/2013 |
| CN | 106063161 A | 10/2016 |
| CN | 106376050 A | 2/2017 |
| WO | 2016153176 A1 | 9/2016 |

OTHER PUBLICATIONS

"RACH procedure", R1-1710271, 3GPP TSG RAN WG1 Meeting NR#2, Qingdao, P.R. China, Jun. 27-30, 2017.
"NR4-step RACH procedure", R1-1710892, 3GPP TSG RAN WG1 Meeting NR#2, Qingdao, P.R. China, Jun. 27-30, 2017.
"On NR carrier aggregation", R1-1712160, 3GPP TSG RAN WG1 Meeting #90, Prague, Czech Republic, Aug. 21-25, 2017.
"Requirements for NR UE timing advance", R4-1706716, 3GPP TSG-RAN WG4 Meeting NR#2 Ad Hoc, Qingdao, China, Jun. 27-29, 2017.
"Timing advance for different numerology", R1-1713453, 3GPP TSG RAN WG1 Meeting #90, Prague, CZ, Aug. 21-25, 2017.
Notice of Reasons for Refusal from JP app. No. 2020-514747, dated Apr. 6, 2021, with English translation from Global Dossier.
First Office Action and search report from CN app. No. 201711030294. 2, dated Dec. 24, 2019, with English translation provided by Global Dossier.
Notification of Reason for Refusal from TW app. No. 107131709, dated May 24, 2020, with machine English translation.
International Search Report from PCT/CN2018/103267, dated Nov. 21, 2018, with English translation from WIPO.
Written Opinion from the International Searching Authority from PCT/CN2018/103267, dated Nov. 21, 2018, with English translation from WIPO.
International Preliminary Report on Patentability from PCT/CN2018/103267, dated Mar. 17, 2020, with English translation from WIPO.

\* cited by examiner

TIMING ADVANCE INDICATION METHOD, BASE STATION, UE AND DEVICE

CROSS-REFERENCE TO RELATED APPLICATIONS

The present application is the U.S. national phase of PCT Application No. PCT/CN2018/103267 filed on Aug. 30, 2018, which claims priority to the Chinese patent application No. 201710814522.9 filed on Sep. 11, 2017 and priority to the Chinese patent application No. 201711030294.2 filed on Oct. 27, 2017, the disclosures of which are incorporated herein by reference in their entireties.

TECHNICAL FIELD

The present disclosure relates to the field of communication technology, in particular to a timing advance indication method, a base station, a UE and a device.

BACKGROUND

In Long Term Evolution (LTE), all downlink and uplink control channels, data channels, and reference signals use the same subcarrier spacing of 15 kHz. In addition, the preamble format of each Physical Random Access Channel (PRACH) supports only one subcarrier spacing (SCS), for example, the subcarrier spacing supported by the preamble format 0-3 is 1.25 kHz, and the subcarrier spacing supported by preamble format 4 is 7.5 kHz.

Different from LTE, 5G new air interface (NR) uplink and downlink control channels, data channels and reference signals can use different subcarrier spacing. At the same time, each preamble sequence format of the NR also supports multiple subcarrier spacing.

In order to avoid mutual interference between user equipment (UE) transmitted on adjacent subframes or adjacent subcarriers, after the UE completes downlink synchronization, it also needs to use Timing Advance (TA) provided by a base station (BS) to advance the time of the uplink transmission. The purpose of this is to ensure that the uplink transmission signals from different UEs in the cell are time aligned at the receiver of the base station to achieve uplink synchronization to maintain uplink orthogonality. When the BS receives the PRACH preamble of the UE, it will estimate the initial TA required by the UE from the access preamble. The BS then transmits the TA included in a Random Access Response (RAR) message to the UE.

In LTE, the TA included in the RAR has a total of 11 bits and uses 16 Ts as a time quantization unit (also called a quantization spacing). Each Ts=1/(30720000) seconds, the 16 Ts is approximately 0.52 µs. LTE selects 16 Ts (0.52 µs) as the unit of time quantization by taking into account the length of a cyclic prefix (CP) of LTE, the uplink timing offset estimation accuracy of the PRACH preamble of the BS, and the timing estimation accuracy of the downlink reference signal by the UE. At the same time, LTE selects TA as 11 bits by taking into account that the maximum cell radius of LTE is at least greater than 100 km. The 11 bits can represent a time range from 0 to 1.066 ms, which corresponds to a maximum cell radius of 160 km, and is larger than the maximum cell radius supported by the LTE PRACH format of 120 km.

Unlike LTE, each preamble sequence format of the NR supports multiple subcarrier spacing. For a kind of preamble sequence format, the maximum cell radius supported by different subcarrier spacing is different. In addition, different subcarrier spacing and different cyclic prefixes may be used to transmit Physical Uplink Shared Channel (PUSCH) and/or Physical Uplink Control Channel (PUCCH). When the random access preamble sequence has the same length, and the subcarrier spacing of the random access sequence increases, the uplink timing offset estimation accuracy increases.

Similarly, when the subcarrier spacing of PUSCH and/or PUCCH increases, time length and a CP window of Orthogonal Frequency Division Multiplexing (OFDM) symbols in the PUSCH and/or PUCCH become smaller. The requirement for time alignment of the uplink transmission signal at the receiver of the base station is correspondingly increased, which will affect the selection of the TA time quantization unit.

SUMMARY

In one aspect, the present disclosure provides in some embodiments a timing advance indication method applied for a base station, includes: transmitting subcarrier spacing configuration information of a physical uplink shared channel (PUSCH) and/or a physical uplink control channel (PUCCH) to a terminal; receiving a preamble fed back by the terminal based on subcarrier spacing configuration information; obtaining a quantized value of a timing advance corresponding to a tracking area based on the preamble; and transmitting the quantized value of the timing advance to the terminal.

Optionally, the obtaining a quantized value of timing advance corresponding to a tracking area based on the preamble includes: estimating a reference timing advance corresponding to the tracking area based on a preamble of a physical random access channel (PRACH) transmitted by the terminal; and obtaining the quantized value of the timing advance based on the reference timing advance and the subcarrier spacing configuration information.

Optionally, the obtaining the quantized value of the timing advance based on the reference timing advance and the subcarrier spacing configuration information includes: obtaining a time quantization unit of the timing advance based on the subcarrier spacing configuration information; and obtaining the quantized value of the timing advance based on the reference timing advance and the time quantization unit of the timing advance.

Optionally, before the obtaining a time quantization unit of the timing advance based on the subcarrier spacing configuration information, the method further includes: configuring one or more timing advance groups for the terminal, each of the timing advance groups including one or more component carriers configured for the terminal; the obtaining a time quantization unit of the timing advance based on the subcarrier spacing configuration information includes: obtaining the time quantization unit of the timing advance corresponding to the timing advance group based on the subcarrier spacing configuration information of uplink bandwidth portions of one or more component carriers included in the timing advance group.

Optionally, the obtaining the time quantization unit of the timing advance corresponding to the timing advance group based on the subcarrier spacing configuration information of uplink bandwidth portions of one or more component carriers included in the timing advance group includes: obtaining a maximum value of subcarrier spacing of all PUSCHs and/or PUCCHs of uplink bandwidth portions of all component carriers included in the timing advance group based on subcarrier spacing configuration information of uplink bandwidth portions of one or more component carriers included in the timing advance group; and obtaining the time quantization unit of the timing advance corresponding to the timing advance group based on the maximum value of the subcarrier spacing.

Optionally, the obtaining the time quantization unit of the timing advance corresponding to the timing advance group based on the subcarrier spacing configuration information of uplink bandwidth portions of one or more component carriers included in the timing advance group includes: obtaining a maximum value of the subcarrier spacing of all PUSCH and/or PUCCH of all activated uplink bandwidth parts of all component carriers included in the timing advance group based on subcarrier spacing configuration information of uplink bandwidth parts of one or more component carriers included in the timing advance group; and obtaining the time quantization unit of the timing advance corresponding to the timing advance group is obtained based on the maximum value of the subcarrier spacing.

Optionally, the obtaining the time quantization unit of the timing advance corresponding to the timing advance group based on the maximum value of the subcarrier spacing includes: searching a time quantization unit N of timing advance corresponding to the maximum value S of the subcarrier spacing in a preconfigured correspondence between the subcarrier spacing in the subcarrier spacing configuration information and the time quantization unit N of the timing advance.

Optionally, the obtaining the quantized value of the timing advance based on the reference timing advance and the time quantization unit of the timing advance includes: determining a target conversion value M based on a ratio of the reference timing advance T to a sampling spacing; and determining the quantized value K of the timing advance based on the target conversion value M and the time quantization unit N of the timing advance.

Optionally, the determining the quantization value K of the timing advance based on the target conversion value M and the time quantization unit N of the timing advance includes: obtaining the quantized value K of the timing advance by using a first preset formula K=M/N.

Optionally, the transmitting the quantized value of the timing advance to the terminal includes: transmitting a random access response message carrying the quantized value of the timing advance to the terminal.

In another aspect, a timing advance indication method applied to a terminal, includes: receiving subcarrier spacing configuration information of a physical uplink shared channel (PUSCH) and/or a physical uplink control channel (PUCCH) transmitted by a base station; feeding back a preamble to the base station based on the subcarrier spacing configuration information; receiving a quantized value of a timing advance corresponding to a tracking area obtained based on the preamble and transmitted by a base station; and determining a target timing advance based on the quantized value of the timing advance and the subcarrier spacing configuration information, and performing uplink timing adjustment.

Optionally, the feeding back a preamble to the base station based on the subcarrier spacing configuration information includes: feeding back the preamble of the physical random access channel (PRACH) to the base station based on received subcarrier spacing configuration information.

Optionally, the receiving the quantized value of the timing advance corresponding to the tracking area obtained based on the preamble transmitted by the base station includes: receiving a random access response message carrying the quantized value of the timing advance transmitted by the base station, and obtaining the quantized value of the timing advance.

Optionally, the determining the target timing advance based on the quantized value of the timing advance and the subcarrier spacing configuration information and performing uplink timing adjustment includes: obtaining the time quantization unit N of the timing advance based on the subcarrier spacing configuration information; determining a target timing advance F based on the time quantization unit N of the timing advance and the quantized value K of the timing advance; and performing uplink timing adjustment based on the target timing advance F.

Optionally, before the obtaining the time quantization unit N of the timing advance based on the subcarrier spacing configuration information, the method further includes: determining one or more timing advance groups configured by the base station for the terminal; wherein each of the timing advance groups comprises one or more component carriers configured for the terminal; the obtaining the time quantization unit N of the timing advance based on the subcarrier spacing configuration information includes: obtaining the time quantization unit N of the timing advance corresponding to the timing advance group based on the subcarrier spacing configuration information of uplink bandwidth portions of one or more component carriers included in the timing advance group.

Optionally, the obtaining the time quantization unit N of the timing advance corresponding to the timing advance group based on the subcarrier spacing configuration information of uplink bandwidth portions of one or more component carriers included in the timing advance group includes: obtaining a maximum value of subcarrier spacing of all PUSCHs and/or PUCCHs of uplink bandwidth portions of all component carriers included in the timing advance group based on subcarrier spacing configuration information of uplink bandwidth portions of one or more component carriers included in the timing advance group; and obtaining the time quantization unit N of the timing advance corresponding to the timing advance group based on the maximum value of the subcarrier spacing.

Optionally, the obtaining the time quantization unit N of the timing advance corresponding to the timing advance group based on the subcarrier spacing configuration information of uplink bandwidth portions of one or more component carriers included in the timing advance group includes: obtaining a maximum value of the subcarrier spacing of all PUSCH and/or PUCCH of all activated uplink bandwidth parts of all component carriers included in the timing advance group based on subcarrier spacing configuration information of uplink bandwidth parts of one or more component carriers included in the timing advance group; and obtaining the time quantization unit of the timing advance corresponding to the timing advance group is obtained based on the maximum value of the subcarrier spacing.

Optionally, the obtaining the time quantization unit of the timing advance corresponding to the timing advance group based on the maximum value of the subcarrier spacing includes: searching a time quantization unit N of timing advance corresponding to the maximum value S of the subcarrier spacing in a preconfigured correspondence between the subcarrier spacing in the subcarrier spacing configuration information and the time quantization unit of the timing advance.

Optionally, the determining the target timing advance F based on the time quantization unit N of the timing advance and the quantized value K of the timing advance includes: obtaining the target timing advance F by using a second preset formula F=N*K.

In yet another aspect, a base station, comprising a transceiver, a memory, a processor, and a program stored on the memory and executable on the processor, wherein the processor is configured to read the program stored on the memory, and the transceiver is configured to: transmit subcarrier spacing configuration information of a physical uplink shared channel (PUSCH) and/or a physical uplink control channel (PUCCH) to a terminal; receive a preamble fed back by the terminal based on subcarrier spacing configuration information; the processor is configured to obtain a quantized value of a timing advance corresponding to a tracking area based on the preamble; and the transceiver is further configured to transmit the quantized value of the timing advance to the terminal.

Optionally, the processor is further configured to: estimate a reference timing advance corresponding to the tracking area based on a preamble of a physical random access channel (PRACH) transmitted by the terminal; and obtain the quantized value of the timing advance based on the reference timing advance and the subcarrier spacing configuration information.

Optionally, the processor is further configured to: obtain a time quantization unit of the timing advance based on the subcarrier spacing configuration information; and obtain the quantized value of the timing advance based on the reference timing advance and the time quantization unit of the timing advance.

Optionally, the processor is further configured to: configure one or more timing advance groups for the terminal, each of the timing advance groups including one or more component carriers configured for the terminal; obtain the time quantization unit of the timing advance corresponding to the timing advance group based on the subcarrier spacing configuration information of uplink bandwidth portions of one or more component carriers included in the timing advance group.

Optionally, the processor is further configured to: obtain a maximum value of subcarrier spacing of all PUSCHs and/or PUCCHs of uplink bandwidth portions of all component carriers included in the timing advance group based on subcarrier spacing configuration information of uplink bandwidth portions of one or more component carriers included in the timing advance group; and obtain the time quantization unit of the timing advance corresponding to the timing advance group based on the maximum value of the subcarrier spacing.

Optionally, the processor is further configured to: obtain a maximum value of the subcarrier spacing of all PUSCH and/or PUCCH of all activated uplink bandwidth parts of all component carriers included in the timing advance group based on subcarrier spacing configuration information of uplink bandwidth parts of one or more component carriers included in the timing advance group; and obtain the time quantization unit of the timing advance corresponding to the timing advance group is obtained based on the maximum value of the subcarrier spacing.

Optionally, the processor is further configured to: search a time quantization unit N of timing advance corresponding to the maximum value S of the subcarrier spacing in a preconfigured correspondence between the subcarrier spacing in the subcarrier spacing configuration information and the time quantization unit N of the timing advance.

Optionally, the processor is further configured to: determine a target conversion value M based on a ratio of the reference timing advance T to a sampling spacing; and determine the quantized value K of the timing advance based on the target conversion value M and the time quantization unit N of the timing advance.

Optionally, the processor is further configured to: obtain the quantized value K of the timing advance by using a first preset formula K=M/N.

Optionally, the processor is further configured to: transmit a random access response message carrying the quantized value of the timing advance to the terminal.

In yet another aspect, a computer readable storage medium includes a program stored thereon, wherein the program is executed by a processor to implement the above timing advance indication method.

In yet another aspect, a timing advance indication device applied for a base station, includes: a first transmitting module, configured to transmit subcarrier spacing configuration information of a physical uplink shared channel (PUSCH) and/or a physical uplink control channel (PUCCH) to a terminal; a first receiving module, configured to receive a preamble fed back by the terminal based on subcarrier spacing configuration information; an obtaining module, configured to obtain a quantized value of a timing advance corresponding to a tracking area based on the preamble; and a second transmitting module, configured to transmit the quantized value of the timing advance to the terminal.

In yet another aspect, a terminal includes a transceiver, a memory, a processor, and a program stored on the memory and executable on the processor, wherein the processor is configured to read the program stored on the memory, and the transceiver is configured to: receive subcarrier spacing configuration information of a physical uplink shared channel (PUSCH) and/or a physical uplink control channel (PUCCH) transmitted by a base station; feedback a preamble to the base station based on the subcarrier spacing configuration information; receive a quantized value of a timing advance corresponding to a tracking area obtained based on the preamble and transmitted by a base station; and the processor is configured to determine a target timing advance based on the quantized value of the timing advance and the subcarrier spacing configuration information, and perform uplink timing adjustment.

Optionally, the transceiver is further configured to: feedback the preamble of the physical random access channel (PRACH) to the base station based on received subcarrier spacing configuration information.

Optionally, the transceiver is further configured to: receive a random access response message carrying the quantized value of the timing advance transmitted by the base station, and obtaining the quantized value of the timing advance.

Optionally, the processor is further configured to: obtain the time quantization unit N of the timing advance based on the subcarrier spacing configuration information; determine a target timing advance F based on the time quantization unit N of the timing advance and the quantized value K of the timing advance; and perform uplink timing adjustment based on the target timing advance F.

Optionally, the processor is further configured to: determine one or more timing advance groups configured by the base station for the terminal; wherein each of the timing advance groups comprises one or more component carriers configured for the terminal; obtain the time quantization unit N of the timing advance corresponding to the timing advance group based on the subcarrier spacing configuration information of uplink bandwidth portions of one or more component carriers included in the timing advance group.

Optionally, the processor is further configured to: obtain a maximum value of subcarrier spacing of all PUSCHs and/or PUCCHs of uplink bandwidth portions of all component carriers included in the timing advance group based on subcarrier spacing configuration information of uplink bandwidth portions of one or more component carriers included in the timing advance group; and obtain the time quantization unit N of the timing advance corresponding to the timing advance group based on the maximum value of the subcarrier spacing.

Optionally, the processor is further configured to: obtain a maximum value of the subcarrier spacing of all PUSCH and/or PUCCH of all activated uplink bandwidth parts of all component carriers included in the timing advance group based on subcarrier spacing configuration information of uplink bandwidth parts of one or more component carriers included in the timing advance group; and obtain the time quantization unit of the timing advance corresponding to the timing advance group is obtained based on the maximum value of the subcarrier spacing.

Optionally, the processor is further configured to: search a time quantization unit N of timing advance corresponding to the maximum value S of the subcarrier spacing in a preconfigured correspondence between the subcarrier spacing in the subcarrier spacing configuration information and the time quantization unit of the timing advance.

Optionally, the processor is further configured to: obtain the target timing advance F by using a second preset formula $F=N*K$.

In yet another aspect, a computer readable storage medium includes a program stored thereon, wherein the program is executed by a processor to implement the above timing advance indication method.

In yet another aspect, a timing advance indication device applied for a terminal, including: a second receiving module, configured to receive subcarrier spacing configuration information of a physical uplink shared channel (PUSCH) and/or a physical uplink control channel (PUCCH) transmitted by a base station; a feedback module, configured to feedback a preamble to the base station based on the subcarrier spacing configuration information; a third receiving module, configured to receive a quantized value of a timing advance corresponding to a tracking area obtained based on the preamble and transmitted by a base station; and a processing module, configured to determine a target timing advance based on the quantized value of the timing advance and the subcarrier spacing configuration information, and perform uplink timing adjustment.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
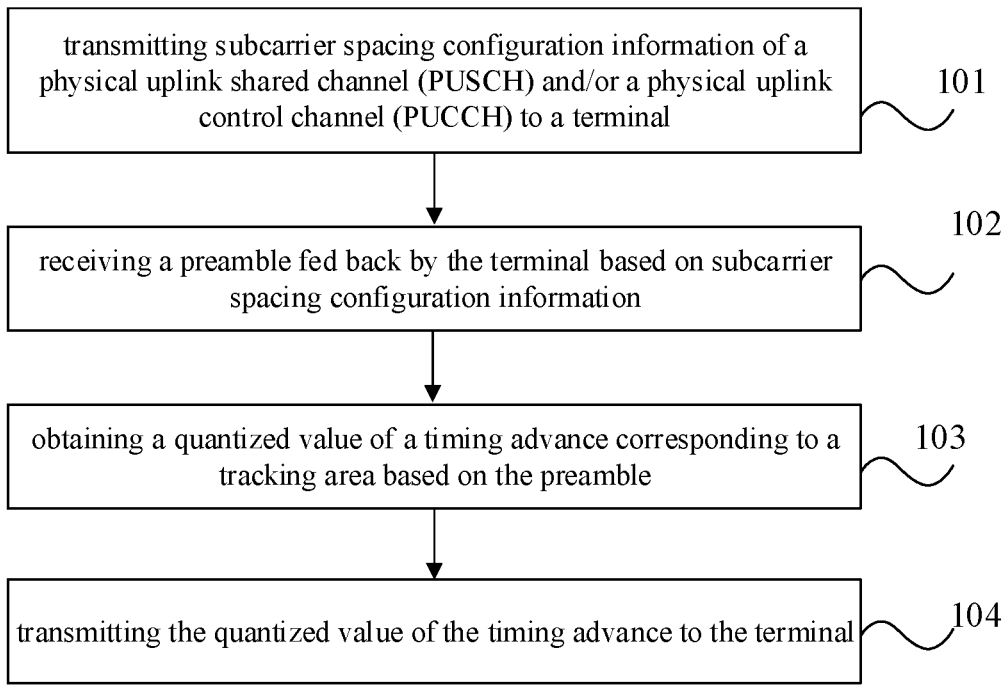
FIG. 1 is a schematic view of a timing advance indication method based on one embodiment of the present disclosure.

As shown in FIG. 1, an embodiment of the present disclosure provides a timing advance indication method, which is applied to a base station. The method includes steps 101 to 104.

Step 101: transmitting subcarrier spacing configuration information of a physical uplink shared channel (PUSCH) and/or a physical uplink control channel (PUCCH) to a terminal.

First, the base station needs to implement a communication connection with the terminal. After the communication connection, the base station performs configuration through its own system to generate the subcarrier spacing configuration information for PUSCH and/or PUCCH, and transmits the subcarrier spacing configuration information to the terminal in communication connection with the base station.

The subcarrier spacing configuration information includes the first series of subcarrier spacing, the first series of subcarrier spacing include 15 kHz, 30 kHz, 60 kHz, and 120 kHz. The subcarrier spacing configuration information can also include the second series of subcarrier spacing and the third series of subcarrier spacing. The second series of subcarrier spacing includes 240 kHz, and the third series of subcarrier spacing includes 480 kHz. The first series of subcarrier spacing and the second series of the subcarrier spacing in and/or relationship. The first series of subcarrier spacing and the third series of the subcarrier spacing in and/or relationship. The second series of subcarrier spacing and the second series of the subcarrier spacing in and/or relationship. In addition, the bit values of the timing advance corresponding to the subcarrier spacing are the same, and are all preset bit values.

The bit values of the timing advance corresponding to the subcarrier spacing included in the subcarrier spacing configuration information are all the same, and the bit value of the timing advance corresponding to the subcarrier spacing in the embodiment of the present disclosure is 11 bits. The 11 bits are used to carry data information sent by the base station to the terminal.

Step 102: receiving a preamble fed back by the terminal based on subcarrier spacing configuration information.

After the base station transmits the subcarrier spacing configuration information to the terminal, the terminal feeds back the PRACH preamble based on the received subcarrier spacing configuration information. The base station receives the preamble from the terminal. After obtaining the preamble, step 103 is performed.

Step 103: obtaining a quantized value of a timing advance corresponding to a tracking area based on the preamble.

After obtaining the preamble from the terminal, the obtaining a quantized value of timing advance corresponding to a tracking area based on the preamble specifically includes: estimating a reference timing advance corresponding to the tracking area based on a preamble of a physical random access channel PRACH transmitted by the terminal; obtaining a quantized value of the timing advance based on the reference timing advance and the subcarrier spacing configuration information.

After obtaining the preamble of PRACH, the base station estimates based on the preamble and obtains the reference timing advance corresponding to the tracking area. After obtaining the reference timing advance, the base station generates the quantized value of the timing advance based on the reference timing advance and the subcarrier spacing configuration information generated by the configuration.

The tracking area is used to represent location management of the UE. When the UE is in an idle state, the base station can obtain the reference timing advance corresponding to the location where the UE is located (i.e., the tracking area). The obtaining the reference timing advance corresponding to the tracking area is to obtain the reference timing advance corresponding to different UEs.

In the embodiment of the present disclosure, the step of obtaining a quantized value of the timing advance based on the reference timing advance and the subcarrier spacing configuration information includes: obtaining a time quantization unit of a timing advance based on the subcarrier spacing configuration information; and obtaining a quantized value of the timing advance based on the reference timing advance and the time quantization unit of the timing advance.

First, the base station needs to obtain the time quantization unit of the corresponding timing advance based on the subcarrier spacing configuration information. After obtaining the time quantization unit of the timing advance, the base station obtains the quantized value of the timing advance based on the estimated reference timing advance and the time quantization unit of the timing advance.

In the embodiment of the present disclosure, before the obtaining a time quantization unit of a timing advance based on the subcarrier spacing configuration information, the method further includes: configuring one or more timing advance groups for the terminal, each of the timing advance groups including one or more component carriers configured for the terminal.

It should be noted that the base station configures one or more component carriers for a certain terminal in an RRC connected mode. These component carriers are divided into the same or different timing advance group (TAG), that is, the base station configures one or more TAGs for the terminal. The link corresponding to each component carrier works in a bandwidth mode, that is, one or more downlink bandwidth parts (DL BWP) and one or more uplink bandwidth parts (UL BWP) are set in the frequency domain. Each BWP can use the same or different subcarrier spacing.

Correspondingly, the step of obtaining a time quantization unit of a timing advance based on the subcarrier spacing configuration information includes: obtaining the time quantization unit of the timing advance corresponding to the timing advance group based on the subcarrier spacing configuration information of an uplink bandwidth portion of one or more component carriers included in the timing advance group.

In the embodiment of the present disclosure, one TAG corresponds to a time quantization unit of a timing advance. Because an uplink bandwidth part of a component carrier included in one TAG includes a plurality of same or different subcarrier spacing of PUSCH/PUCCH, in the specific embodiment of the present disclosure, the following two modes are used to determine the time quantization unit of the timing advance corresponding to each timing advance group.

Mode 1: The maximum value of the subcarrier spacing of all PUSCHs and/or PUCCHs of uplink bandwidth portions of all component carriers included in the timing advance group is obtained based on subcarrier spacing configuration information of uplink bandwidth portions of one or more component carriers included in the timing advance group. A time quantization unit of a timing advance corresponding to the timing advance group is obtained based on the maximum value of the subcarrier spacing.

It should be noted that all component carriers included in the TAG include: an uplink carrier, a downlink carrier, and/or a Supplemental Uplink Carrier (SUL).

In this mode, the maximum value of the subcarrier spacing is selected from the subcarrier spacing of all the PUSCH/PUCCH in all the uplink bandwidth parts of all the component carriers in the TAG, regardless of whether the uplink bandwidth part is active or not. The time quantization unit of the timing advance corresponding to the maximum value of the selected subcarrier spacing is determined as the time quantization unit of the timing advance of the TAG. As shown in table 2:

TABLE 2

| maximum value of the subcarrier spacing of all the PUSCH/PUCCH in all the uplink bandwidth parts of all the component carriers in the TAG (kHz) | time quantization unit of the timing advance (Ts = 1/(64 * 3072000) second) |
| --- | --- |
| 15 | 16 * 64 |
| 30 | 8 * 64 |
| 60 | 4 * 64 |
| 120 | 2 * 64 |
| 240 | 64 |
| 480 | 32 |

Mode 2: The maximum value of the subcarrier spacing of all PUSCH and/or PUCCH of all activated uplink bandwidth parts of all component carriers included in the timing advance group is obtained based on subcarrier spacing configuration information of an uplink bandwidth part of one or more component carriers included in the timing advance group. A time quantization unit of the timing advance corresponding to the timing advance group is obtained based on the maximum value of the subcarrier spacing.

It should be noted that all component carriers included in the TAG include: an uplink carrier, a downlink carrier, and/or a supplemental uplink carrier (SUL). In this mode, only the activated uplink bandwidth parts are considered, and the maximum value of the subcarrier spacing is selected from the subcarrier spacing of all PUSCH/PUCCH in all active uplink bandwidth parts of all component carriers in the TAG. The time quantization unit of the timing advance corresponding to the maximum value of the selected subcarrier spacing is determined as the time quantization unit of the timing advance of the TAG. As shown in Table 3:

TABLE 3

| maximum value of the subcarrier spacing of all PUSCH/PUCCH in all the active uplink bandwidth parts of all component carriers in the TAG (kHz) | time quantization unit of the timing advance (Ts = 1/(64 * 3072000) seconds) |
| --- | --- |
| 15 | 16 * 64 |
| 30 | 8 * 64 |
| 60 | 4 * 64 |
| 120 | 2 * 64 |
| 240 | 64 |
| 480 | 32 |

It further needs to be explained that the base station can simultaneously activate/deactivate a plurality of BWPs through dedicated RRC signaling or other faster commands (such as L1 signaling).

Optionally, in the embodiment of the present disclosure, the step of obtaining a time quantization unit of a timing advance corresponding to the timing advance group based on the maximum value of the subcarrier spacing includes: searching a time quantization unit N of the timing advance corresponding to the maximum value S of the subcarrier spacing in a preconfigured correspondence between the subcarrier spacing in the spacing configuration information and the time quantization unit of the timing advance.

In summary, in the two modes provided in the above embodiments of the present disclosure, regardless of whether the base station configures one or more TAGs for the terminals in the RRC connection mode, regardless of whether each TAG has one or more component carriers, and regardless of each component carrier configures one or more DL BWP and UL BWP, the above two modes are effective to determine the time quantization unit of the timing advance corresponding to each timing advance group.

Further, since the terminal knows the subcarrier spacing for all configured UL BWPs in the TAG, there is no need to have a specific signaling to notify the terminal of the time quantization unit of the timing advance of the TAG, which can effectively save signaling cost. Since the time quantization unit of the timing advance determined by the above two modes is the best among granularities required for all configured UL BWPs in each TAG, so the determined time quantization unit of the timing advance can meet synchronization requirements for all UL configuring UL BWP in this TAG. Since the terminal can configure any quantity of timing advance groups, any quantity of uplink and downlink component carriers, any quantity of configured or activated DL/UL BWP, the implementation is simple and not affected by system configuration.

The correspondence between the subcarrier spacing and the time quantization unit of the timing advance is shown in Table 2 or Table 3. According to the maximum value S of the subcarrier spacing, in the correspondence, a time quantization unit N of a corresponding timing advance determined. In the embodiments of the present disclosure, the first series of subcarrier spacing included in the subcarrier spacing configuration information are 15 kHz, 30 kHz, 60 kHz, and 120 kHz; the second series of subcarrier spacing configuration information is 240 kHz; the third series of subcarrier spacing configuration information is 480 kHz. The correspondence between the maximum value S of the subcarrier spacing and the time quantization unit N of the timing advance is that, when the maximum value S of the subcarrier spacing is $15*2^n$ kHz, the time unit N of the timing advance is $16*64*2^{-n} T_s$, where Ts is the sampling spacing, which is defined as $1/(64*30720000)$ seconds. For the first series of subcarrier spacing, the value of n is 0, 1, 2, or 3; for the second series of subcarrier spacing, the value of n is 4; and for the third series of subcarrier spacing, the value of n is 5.

When the subcarrier spacing is 15 kHz, the corresponding n value in $15*2^n$ kHz is 0. According to the correspondence between the maximum value S of the subcarrier spacing and the time quantization unit N of the timing advance, when n is 0, the value of n in $16*64*2^{-n} T_s$ is also 0, and the time quantization unit N of the timing advance is $16*64 T_s$. When the subcarrier spacing is 30 kHz, the corresponding n value in $15*2^n$ kHz is 1. According to the correspondence between the maximum value S of the subcarrier spacing and the time quantization unit N of the timing advance, when the n value is 1, the value of n in $16*64*2^{-n} T_s$ is also 1, and the time quantization unit N of the timing advance is $8*64 T_s$. Correspondingly, when the subcarrier spacing is 60 kHz, the corresponding n value in $15*2^n$ kHz is 2. According to the correspondence between the maximum value S of the subcarrier spacing and the time quantization unit N of the timing advance, when n is 2, the value of n in $16*64*2^{-n} T_s$ is also 2. At this time, the time quantization unit N of the timing advance is $4*64 T_s$. For the cases of 120 kHz, 240 kHz and 480 kHz, they will not be listed here.

The correspondence between the maximum value S of the subcarrier spacing and the time quantization unit N of the timing advance is predetermined, and the specific definition process is explained below. When the subcarrier spacing is 15 kHz, the time quantization unit of the NR timing advance can be selected based on the time quantization unit of the timing advance in LTE, which is $16/(30720000)$ seconds. In NR, each Ts is defined as $1/(64*30720000)$ seconds. Therefore, when the subcarrier spacing is 15 kHz, the time quantization unit of the NR timing advance is $16*64 T_s$. When the subcarrier spacing is 30 kHz, the time spacing of the CP and OFDM symbols of the PUCCH and/or PUSCH is reduced by half, and the accuracy and precision of the timing advance for uplink timing adjustment is also doubled. Therefore, when the subcarrier spacing is 30 kHz, the time quantization unit of the NR timing advance should be: $8*64 T_s$, that is, the time quantization unit of the corresponding timing advance at this time is half of the time quantization unit of the corresponding timing advance when the subcarrier spacing is 15 kHz. Using the same principle, it can be determined that when the subcarrier spacing of PUCCH and/or PUSCH is 60 kHz, the time quantization unit of the NR timing advance should be $4*64 T_s$. When the subcarrier spacing of PUCCH and/or PUSCH is 120 kHz, the time quantization unit of the NR timing advance should be: $2*64 T_s$, when the subcarrier spacing of the PUCCH and/or PUSCH is 240 kHz, the time quantization unit of the NR timing advance should be: $64 T_s$, and when the subcarrier spacing of the PUCCH and/or PUSCH is 480 kHz, and the time quantization unit of the NR timing advance should be: $0.5*64 T_s$.

Based on the above process, the correspondence between the maximum value S of the subcarrier spacing and the time quantization unit N of the timing advancement can be determined. For the first series of subcarrier spacing, when the maximum value S of the subcarrier spacing is $15*2^n$ kHz, the time quantization unit N of the timing advance is $16*64*2^{-n} T_s$, and the values of n are 0, 1, 2, and 3. For the second series of subcarrier spacing, when the maximum subcarrier spacing S is $15*2^n$ kHz, the time quantization unit N of the timing advance is $16*64*2^{-n} T_s$, where the value of n is 4; and for the third series of subcarrier spacing, when the maximum subcarrier spacing S is $15*2^n$ kHz, the time quantization unit N of the timing advance is $16*64*2^{-n} T_s$, the value of n is 5.

When the base station needs to acquire the time quantization unit N of the timing advance corresponding to the maximum value S of the subcarrier spacing, the above-mentioned correspondence may be searched to obtain the time quantization unit N of the required timing advance.

After obtaining the time quantization unit of the timing advance, the obtaining the quantized value of the timing advance based on the reference timing advance and the time quantization unit of the timing advance includes: determining a target conversion value M based on a ratio of the reference timing advance T to a sampling spacing; and determining the quantized value K of the timing advance based on the target conversion value M and a time quantization unit N of the timing advance.

First, the obtained reference timing advance T is converted to obtain a target conversion value. In the conversion, the sampling spacing Ts corresponding to the NR needs to be adopted. In the NR, each Ts is defined as 1/(64*30720000) seconds. The conversion process includes calculating the ratio of the reference timing advance T and Ts, determining the obtained ratio as the target conversion value M, then Ts being the unit corresponding to the obtained target conversion value M.

After obtaining the target conversion value M corresponding to the reference timing advance T and the time quantization unit N of the timing advance corresponding to the maximum value S of the subcarrier spacing, the base station may determines the quantization value K of the timing advance based on the target conversion value M and the time quantization unit N of the timing advance. Specifically, it is calculated by using a first preset formula K=M/N to obtain a quantization value K of the timing advance corresponding to the maximum value S of the subcarrier spacing.

That is, the ratio of the target conversion value M to the time quantization unit N of the timing advance is calculated, and the obtained ratio is determined as the quantization value K of the timing advance corresponding to the maximum value S of the subcarrier spacing. The target conversion value M is determined, and the time quantization unit N of the timing advance corresponding to the maximum value S of the subcarrier spacing varies with the change of the subcarrier spacing. The larger the time quantization unit N of the timing advance corresponding to the maximum value S of the subcarrier spacing is, the smaller the quantization value K of the corresponding timing advance is.

For example: the reference timing advance T is 100 μs, and 100 μs is converted to obtain the corresponding target conversion value M. The conversion process is as follows. At first, 100 μs is converted to 1/10000 s, because each Ts is defined as 1/(64*30720000), the target conversion value M is a ratio of 1/10000 s to Ts, and it is determined that the obtained target conversion value M is equal to 196608 Ts.

When the subcarrier spacing is 15 kHz, the time quantization unit of the NR timing advance is 16*64 Ts, then the quantization value K of the timing advance corresponding to the maximum value S of the 15 kHz subcarrier spacing is 196608 Ts/(16*64 Ts)=192, and the obtained quantized value K of the timing advance transmitted by the base station to the terminal is 192. When the subcarrier spacing is 30 kHz, the time quantization unit of the NR timing advance is 8*64 Ts, then the quantized value K of the timing advance corresponding to the maximum value S of the 30 kHz subcarrier spacing is 196608 Ts/(8*64 Ts)=384, and the obtained quantized value K of the timing advance transmitted by the base station to the terminal is 384.

It should be noted that the maximum cell radius supported by different subcarrier spacing is different. The bit value of the timing advance corresponding to each of the subcarrier spacing in the embodiment of the present disclosure is the same and is a preset bit value. The preset bit value is 11 bits, and the process of determining the bit value of the timing advance being 11 bits is explained below.

Each preamble sequence format of the NR supports a plurality of subcarrier spacing. For one preamble sequence format, the maximum cell radius supported by different subcarrier spacing is different. When selecting the quantity of bits for the NR timing advance, it is necessary to consider the maximum cell radius that can be supported by all preamble sequences under each subcarrier spacing. The timing advance included in the RAR in LTE has a total of 11 bits, which can represent a time range of 0 to 1.066 ms, corresponding to a maximum cell radius of 160 km, which is larger than the maximum cell radius supported by the LTE PRACH format of 120 km. We propose here that a same quantity of bits is selected for the NR timing advance as for LTE, and the maximum cell radius that can be supported is calculated based on the time quantization unit of the NR timing advance mentioned above. It is determined whether the maximum cell radius supported by all preamble sequences can be supported at each subcarrier spacing. Table 1 shows the maximum cell radius supported by the 11 bits of timing advance under the above conditions.

In Table 1, when the subcarrier spacing of PUCCH and/or PUSCH is 15 kHz, the maximum cell radius supported by the 11 bits of timing advance is 160 km. When the subcarrier spacing of PUCCH and/or PUSCH increases, a preamble sequence with a large NR subcarrier spacing will be used. For example, PUSCH and/or PUCCH with 120 kHz and 240 kHz subcarrier spacing are only used in carrier frequencies higher than 6 GHz. At the carrier frequency higher than 6 GHz, the PRACH preamble sequence will use a subcarrier spacing of 15 kHz or greater, and support the maximum cell radius not exceeding 5 km. In summary, the quantity of bits of the NR timing advance can be selected as 11.

TABLE 1

| subcarrier spacing of PUSCH/PUCCH | time quantization unit of the timing advance Ts = 1/(64 * 30720000) second | maximum cell radius supported by the timing advance |
|---|---|---|
| 15 kHz | N1 = 16 * 64 $T_s$ | 160 km |
| 30 kHz | N2 = 8 * 64 $T_s$ | 80 km |
| 60 kHz | N3 = 4 * 64 $T_s$ | 40 km |
| 120 kHz | N4 = 2 * 64 $T_s$ | 20 km |
| 240 kHz | N5 = 64 $T_s$ | 10 km |
| 480 kHz | N6 = 0.5 * 64 $T_s$ | 5 km |

According to Table 1, the subcarrier spacing in the subcarrier spacing configuration information supported by the embodiment of the present disclosure corresponds to a time quantization unit of a timing advance, and corresponds to a maximum cell radius supported by a timing advance.

The maximum cell radius supported by the timing advance having the preset bit value can be determined based on the maximum value S of the subcarrier spacing, the time quantization unit N of the timing advance corresponding to the maximum value S of the subcarrier spacing, and the preset bit value. The time quantization unit N of the timing advance decreases as the maximum value S of the subcarrier spacing increases, and the maximum cell radius supported by the timing advance having the preset bit value decreases as the maximum value S of the subcarrier spacing increases, the maximum cell radius supported by the timing advance having the preset bit value increases as the time quantization unit N of the timing advance increases.

The specific process is as follows. When the current preset bit value is 11, the preset bit value 11 is digitally discretized to determine the corresponding maximum digital value $(2^{11}-1)$, where the corresponding maximum digital value is 2047, and then it is calculated based on the time quantization unit N of the timing advance of the maximum value S of the subcarrier spacing. The specific calculation process is as follows. The product of $(2^{11}-1)$ and the time quantization unit N of the timing advance is calculated to obtain a first reference value, and then the product of the first reference value and the light speed c is calculated to obtain a second reference value, and one-half of the obtained second reference value is determined as the maximum cell radius supported by the timing advance having the 11-bit value. Here, since the light speed in the air is approximately equal to the light speed in a vacuum, the value of the light speed c is 299792458 m/s.

Taking the subcarrier spacing of 15 kHz as an example, at this time, the time quantization unit of the timing advance corresponding to the subcarrier spacing is $16*64\ T_s$. The product of 2047 and $16*64\ T_s$ is calculated to obtain the first reference value. The first reference value is approximately 0.0010661458 seconds at this time. Then the product of the first reference value 0.0010661458 seconds and the light speed c (299792458 m/s) is calculated to obtain the second reference value, where the calculation process of the second reference value is (299792458 m/s)*0.0010661458 seconds ≈319622.5 meters. Then one-half of the second reference value is calculated. When the subcarrier spacing is 15 kHz, the maximum cell radius supported by the timing advance is 159811.25 meters, which can be approximately 159.8 km at this time, and can be approximately equal to 160 km.

Taking the subcarrier spacing of 30 kHz as an example, at this time, the time quantization unit of the timing advance corresponding to the subcarrier spacing is $8*64\ T_s$. The product of 2047 and $8*64\ T_s$ is calculated to obtain the first reference value. The first reference value is approximately 0.0005330729 seconds at this time. Then the product of the first reference value 0.0005330729 seconds and the light speed c (299792458 m/s) is calculated to obtain the second reference value, where the calculation process of the second reference value is (299792458 m/s)*0.0005330729 seconds ≈159811.2 meters. Then one-half of the second reference value is calculated. When the subcarrier spacing is 30 kHz, the maximum cell radius supported by the timing advance is 79905.6 meters, which can be approximately 79.9 km at this time, and can be approximately equal to 80 km.

The foregoing is to determine the maximum cell radius supported by the timing advance having the preset bit value based on the maximum value S of subcarrier spacing, the time quantization unit N of the timing advance corresponding to the maximum subcarrier spacing S, and the preset bit value. The maximum cell radius supported by the timing advance is related to the maximum value S of the subcarrier spacing, the time quantization unit N of the timing advance, and the preset bit value.

It can be seen from Table 1 that as the subcarrier spacing increases in sequence, the time quantization unit of the timing advancement decreases in sequence, and the maximum cell radius supported by the timing advancement decreases in sequence. It can be simply understood that the time quantization unit of the timing advance is negatively related to the subcarrier spacing, the maximum cell radius supported by the timing advance is negatively related to the subcarrier spacing, and the time quantization unit of the timing advance is positively related to the maximum cell radius supported by the timing advance.

After determining the quantized value K of the timing advance corresponding to the maximum value S of the subcarrier spacing based on the target conversion value M and the time quantization unit N of the timing advance corresponding to and the maximum value S of the subcarrier spacing, and the base station then executes step 104.

Step 104: transmitting the quantized value of the timing advance to the terminal.

When the quantized value of the timing advance is transmitted to the terminal, the quantized value of the timing advance is included in a corresponding random access message, and a random access response message carrying the quantized value of the timing advance is transmitted to the terminal. The quantized value of the timing advance transmitted to the terminal is carried by 11 bits.

After receiving the random access response message carrying the quantized value of the timing advance, the terminal extracts the quantized value of the timing advance in the random access response message, and after obtaining the quantized value of the timing advance, the received subcarrier spacing configuration information and the obtained quantized value of the timing advance are calculated by the terminal to determine a target timing advance, and uplink timing adjustment is performed based on the target timing advance to effectively implement the uplink timing advance indication.

In summary, in the foregoing timing advance indication method based on the embodiment of the present disclosure, the base station transmits subcarrier spacing configuration information to the terminal. After receiving the subcarrier spacing configuration information, the terminal feeds back a preamble to the base station, and the base station obtains the quantized value of the timing advance corresponding to the tracking area based on the preamble, and transmits the quantized value to the terminal, so that the terminal determines the target timing advance based on the obtained quantized value of the timing advance and the subcarrier spacing configuration information, and performs uplink timing adjustment. Under the condition that the signaling overhead is unchanged, the uplink timing advancement indication is effectively realized, and the 5G NR random access mechanism can adjust the quantization unit of the timing advance based on the uplink carrier spacing to achieve uplink orthogonality. The method also supports the maximum cell radius supported by all current NR preamble sequences.

Figure 2:
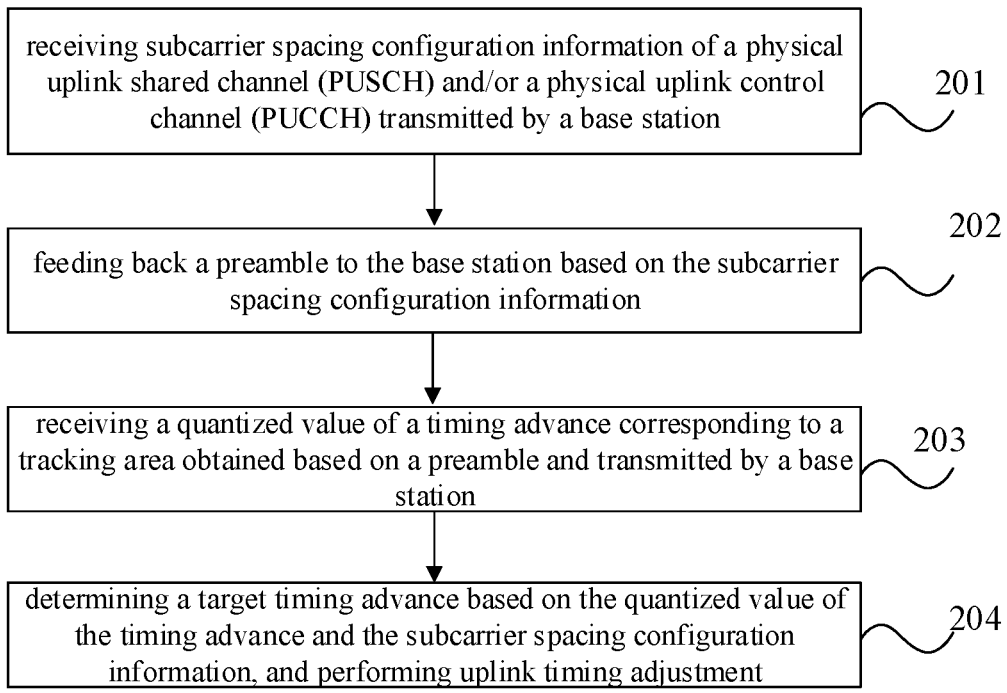
FIG. 2 is another schematic view of a timing advance indication method based on one embodiment of the present disclosure.

As shown in FIG. 2, an embodiment of the present disclosure further provides a timing advance indication method, which is applied to a terminal and includes steps 201 to 204.

Step 201: receiving subcarrier spacing configuration information of a physical uplink shared channel (PUSCH) and/or a physical uplink control channel (PUCCH) transmitted by a base station.

First, the terminal needs to implement a communication connection with the base station. After the communication connection, the terminal can receive subcarrier spacing configuration information transmitted by the base station. The subcarrier spacing configuration information includes the first series of subcarrier spacing, the first series of subcarrier spacing include 15 kHz, 30 kHz, 60 kHz, and 120 kHz. The subcarrier spacing configuration information can also include the second series of subcarrier spacing and the third series of subcarrier spacing. The second series of subcarrier spacing includes 240 kHz, and the third series of subcarrier spacing includes 480 kHz. The first series of subcarrier spacing and the second series of the subcarrier spacing in and/or relationship. The first series of subcarrier spacing and the third series of the subcarrier spacing in and/or relationship. The second series of subcarrier spacing and the second series of the subcarrier spacing in and/or relationship. In addition, the bit values of the timing advance corresponding to the subcarrier spacing are the same, and are all preset bit values, and the preset bit value is 11 bits.

Step 202: feeding back a preamble to the base station based on the subcarrier spacing configuration information.

After receiving the subcarrier spacing configuration information transmitted by the base station, the process of feeding back, by the terminal, a preamble to the base station based on the subcarrier spacing configuration information includes: feeding back the preamble of the physical random access channel PRACH to the base station based on the received subcarrier spacing configuration information, so that the base station obtains a quantized value of a timing advance amount corresponding to a tracking area based on the received preamble. The process of obtaining, by the base station, the quantized value of the timing advance based on the preamble is not described in detail here.

After obtaining the quantized value of the timing advance based on the preamble, the bases station transmits the obtained quantized value of the timing advance to the terminal.

Step 203: receiving a quantized value of a timing advance corresponding to a tracking area obtained based on a preamble and transmitted by a base station.

After the terminal feeds back the preamble to the base station, the base station determines the quantized value of the timing advance corresponding to the tracking area based on the preamble. The receiving, by the terminal, the quantized value of the timing advance includes: receiving, by the terminal, a random access response message carrying the quantized value of the timing advance transmitted by the base station, and obtaining the quantized value of the timing advance.

After the terminal feeds back the preamble to the base station, the terminal receives a random access response message carrying a quantized value of the timing advance transmitted by the base station, and obtains a quantized value of the timing advance in the random access response message. The quantized value of the timing advance has a number same as the number of subcarrier spacing in the subcarrier spacing configuration information, and each subcarrier spacing corresponds to one quantized value of a timing advance.

In the embodiment of the present disclosure, when the reference timing advance T obtained by the base station is 100 μs, the quantized value K of the timing advance corresponding to the subcarrier spacing of 15 kHz transmitted to the terminal by the base station is 192. The quantized value K of the timing advance corresponding to the subcarrier spacing of 30 kHz is 384. The quantized value K of the timing advance corresponding to the subcarrier spacing of 60 kHz is 768. The quantized value K of the timing advance corresponding to the subcarrier spacing of 120 kHz is 1536. The quantized value K of the timing advance corresponding to the subcarrier spacing of 240 kHz is 6144.

Step 204: determining a target timing advance based on the quantized value of the timing advance and the subcarrier spacing configuration information, and performing uplink timing adjustment.

After receiving the quantized value of the timing advance corresponding to each subcarrier spacing transmitted by the base station, the obtained quantized value of the timing advance and the subcarrier spacing configuration information received in advance are calculated to obtain the target timing advance. After obtaining the target timing advance, the uplink timing is adjusted based on the target timing advance to effectively implement the uplink timing advance indication.

The step of determining the target timing advance based on the quantized value of the timing advance and the subcarrier spacing configuration information and performing uplink timing adjustment includes: obtaining the time quantization unit N of the timing advance based on the subcarrier spacing configuration information; determining the target timing advance F based on the time quantization unit N of the timing advance and the quantized value K of the timing advance; and performing uplink timing adjustment based on the target timing advance F.

In the embodiment of the present disclosure, before obtaining the time quantization unit N of the timing advance based on the subcarrier spacing configuration information, the method further includes: determining one or more timing advance groups configured by the base station for the terminal; wherein each of the timing advance groups includes: one or more component carriers configured for the terminal.

It should be noted that the base station configures one or more component carriers for a certain terminal in an RRC connected mode. These component carriers are divided into the same or different timing advance group (TAG), that is, the base station configures one or more TAGs for the terminal. The link corresponding to each component carrier works in a bandwidth mode, that is, one or more downlink bandwidth parts (DL BWP) and one or more uplink bandwidth parts (UL BWP) are set in the frequency domain. Each BWP can use the same or different subcarrier spacing.

Correspondingly, the step of obtaining a time quantization unit N of a timing advance based on the subcarrier spacing configuration information includes: obtaining the time quantization unit of the timing advance corresponding to the timing advance group based on the subcarrier spacing configuration information of an uplink bandwidth portion of one or more component carriers included in the timing advance group.

In the embodiment of the present disclosure, one TAG corresponds to a time quantization unit of a timing advance. Because an uplink bandwidth part of a component carrier included in one TAG includes a plurality of same or different subcarrier spacing of PUSCH/PUCCH, in the specific embodiment of the present disclosure, the following two modes are used to determine the time quantization unit of the timing advance corresponding to each timing advance group.

Mode 1: The maximum value of the subcarrier spacing of all PUSCHs and/or PUCCHs of uplink bandwidth portions of all component carriers included in the timing advance group is obtained based on subcarrier spacing configuration information of uplink bandwidth portions of one or more component carriers included in the timing advance group. A time quantization unit of a timing advance corresponding to the timing advance group is obtained based on the maximum value of the subcarrier spacing.

It should be noted that all component carriers included in the TAG include: an uplink carrier, a downlink carrier, and/or a Supplemental Uplink Carrier (SUL).

In this mode, the maximum value of the subcarrier spacing is selected from the subcarrier spacing of all the PUSCH/PUCCH in all the uplink bandwidth parts of all the component carriers in the TAG, regardless of whether the uplink bandwidth part is active or not. The time quantization unit of the timing advance corresponding to the maximum value of the selected subcarrier spacing is determined as the time quantization unit of the timing advance of the TAG.

Mode 2: The maximum value of the subcarrier spacing of all PUSCH and/or PUCCH of all activated uplink bandwidth parts of all component carriers included in the timing advance group is obtained based on subcarrier spacing configuration information of an uplink bandwidth part of one or more component carriers included in the timing advance group. A time quantization unit of the timing advance corresponding to the timing advance group is obtained based on the maximum value of the subcarrier spacing.

It should be noted that all component carriers included in the TAG include: an uplink carrier, a downlink carrier, and/or a supplemental uplink carrier (SUL). In this mode, only the activated uplink bandwidth parts are considered, and the maximum value of the subcarrier spacing is selected from the subcarrier spacing of all PUSCH/PUCCH in all the active uplink bandwidth parts of all component carriers in the TAG. The time quantization unit of the timing advance corresponding to the maximum value of the selected subcarrier spacing is determined as the time quantization unit of the timing advance of the TAG.

It further needs to be explained that the base station can simultaneously activate/deactivate a plurality of BWPs through dedicated RRC signaling or other faster commands (such as L1 signaling).

Optionally, in the embodiment of the present disclosure, the step of obtaining a time quantization unit of a timing advance corresponding to the timing advance group based on the maximum value of the subcarrier spacing includes: searching a time quantization unit N of the timing advance corresponding to the maximum value S of the subcarrier spacing in a preconfigured correspondence between the subcarrier spacing in the spacing configuration information and the time quantization unit of the timing advance.

In summary, in the two modes provided in the above embodiments of the present disclosure, regardless of whether the base station configures one or more TAGs for the terminals in the RRC connection mode, regardless of whether each TAG has one or more component carriers, and regardless of each component carrier configures one or more DL BWP and UL BWP, the above two modes are effective to determine the time quantization unit of the timing advance corresponding to each timing advance group.

Further, since the terminal knows the subcarrier spacing for all configured UL BWPs in the TAG, there is no need to have a specific signaling to notify the terminal of the time quantization unit of the timing advance of the TAG, which can effectively save signaling cost. Since the time quantization unit of the timing advance determined by the above two modes is the best among granularities required for all configured UL BWPs in each TAG, so the determined time quantization unit of the timing advance can meet synchronization requirements for all UL configuring UL BWP in this TAG. Since the terminal can configure any quantity of timing advance groups, any quantity of uplink and downlink component carriers, any quantity of configured or activated DL/UL BWP, the implementation is simple and not affected by system configuration.

According to the maximum value S of the subcarrier spacing, in the correspondence, a time quantization unit N of a corresponding timing advance determined. In the embodiments of the present disclosure, the first series of subcarrier spacing included in the subcarrier spacing configuration information are 15 kHz, 30 kHz, 60 kHz, and 120 kHz; the second series of subcarrier spacing configuration information is 240 kHz; the third series of subcarrier spacing configuration information is 480 kHz. The correspondence between the maximum value S of the subcarrier spacing and the time quantization unit N of the timing advance is that, when the maximum value S of the subcarrier spacing is $15*2^n$ kHz, the time unit N of the timing advance is $16*64*2^{-n} T_s$, where Ts is the sampling spacing, which is defined as $1/(64*30720000)$ seconds. For the first series of subcarrier spacing, the value of n is 0, 1, 2, or 3; for the second series of subcarrier spacing, the value of n is 4; and for the third series of subcarrier spacing, the value of n is 5.

When the subcarrier spacing is 15 kHz, the corresponding n value in $15*2^n$ kHz is 0. According to the correspondence between the maximum value S of the subcarrier spacing and the time quantization unit N of the timing advance, when n is 0, the value of n in $16*64*2^{-n} T_s$ is also 0, and the time quantization unit N of the timing advance is $16*64 T_s$. When the subcarrier spacing is 30 kHz, the corresponding n value in $15*2^n$ kHz is 1. According to the correspondence between the maximum value S of the subcarrier spacing and the time quantization unit N of the timing advance, when the n value is 1, the value of n in $16*64*2^{-n} T_s$ is also 1, and the time quantization unit N of the timing advance is $8*64 T_s$. Correspondingly, when the subcarrier spacing is 60 kHz, the corresponding n value in $15*2^n$ kHz is 2. According to the correspondence between the maximum value S of the subcarrier spacing and the time quantization unit N of the timing advance, when n is 2, the value of n in $16*64*2^{-n} T_s$ is also 2. At this time, the time quantization unit N of the timing advance is $4*64 T_s$. For the cases of 120 kHz, 240 kHz and 480 kHz, they will not be listed here and the specific situations can be seen in Table 1.

The correspondence between the maximum value S of the subcarrier spacing and the time quantization unit N of the timing advance is predetermined. The specific definition process will not be described here. The description on the base station side may be referred to for details.

After determining the time quantization unit N of the timing advance, the step of determining the target timing advance F corresponding to the maximum value S of the subcarrier spacing in the subcarrier spacing configuration information based on the time quantization unit N of the timing advance and the quantized value K of the timing advance includes: performing calculation by using a second preset formula $F=N*K$ to obtain the target timing advance F.

After the time quantization unit N of the timing advance is determined, a product of the time quantization unit N of the timing advance and the quantized value K of the timing advance is calculated to determine the product as the target timing advance F. The subcarrier spacing corresponds to a time quantization unit N of a timing advance, and the subcarrier spacing corresponds to a quantized value K of a timing advance.

In the foregoing process, the quantized value of the timing advance transmitted from the base station to the terminal is obtained. When the reference timing advance T obtained by the base station is 100 μs, the quantized values of the timing advance received by the terminal are as follows. The quantized value of the timing advance corresponding to the subcarrier spacing of 15 kHz is 192. The quantized value of the timing advance corresponding to the subcarrier spacing of 30 kHz is 384. The quantized value of the timing advance corresponding to the subcarrier spacing of 60 kHz is 768. The quantized value of the timing advance corresponding to the subcarrier spacing of 120 kHz is 1536. The quantized value of the timing advance corresponding to the subcarrier spacing of 240 kHz is 3072. The quantized value of the timing advance corresponding to the subcarrier spacing of 480 kHz is 6144.

According to the correspondence between the maximum value S of the subcarrier spacing and the time quantization unit N of the timing advance, the time quantization unit N of the timing advance corresponding to the subcarrier spacing of 15 kHz is $16*64\ T_s$. The time quantization unit N of the timing advance corresponding to the subcarrier spacing of 30 kHz is $8*64\ T_s$. The time quantization unit N of the timing advance corresponding to the subcarrier spacing of 60 kHz is $4*64\ T_s$. The time quantization unit N of the timing advance corresponding to the subcarrier spacing of 120 kHz is $2*64\ T_s$. The time quantization unit N of the timing advance corresponding to the subcarrier spacing of 240 kHz is $64\ T_s$. The time quantization unit N of the timing advance corresponding to the subcarrier spacing of 480 kHz is $0.5*64\ T_s$.

For the subcarrier spacing of 15 kHz, the corresponding target timing advance F is $16*64\ T_s*192$, where the value of $16*64\ T_s*192$ is $1/10000$ s. For the subcarrier spacing of 30 kHz, the corresponding target timing advance F is $8*64\ T_s*384$, where the value of $8*64\ T_s*384$ is $1/10000$ s. For the subcarrier spacing of 60 kHz, the corresponding target timing advance F is $4*64\ T_s*768$, where the value of $4*64\ T_s*768$ is $1/10000$ s. For the subcarrier spacing of 120 kHz, the corresponding target timing advance F is $2*64\ T_s*1536$, where the value of $2*64\ T_s*1536$ is $1/10000$ s. For the subcarrier spacing of 240 kHz, the corresponding target timing advance F is $64\ T_s*3072$, where the value of $64\ T_s*3072$ is $1/10000$ s. For the subcarrier spacing of 480 kHz, the corresponding target timing advance F is $0.5*64\ T_s*6144$, where the value of $0.5*64\ T_s*6144$ is $1/10000$ s.

After the terminal obtains the target timing advance, the terminal may perform uplink timing adjustment based on the target timing advance. It is ensured that uplink transmission signals from different terminals in the cell are time aligned at the receiver of the base station to achieve uplink synchronization and maintain uplink orthogonality.

In summary, in the foregoing timing advance indication method based on the embodiment of the present disclosure, the terminal receives subcarrier spacing configuration information from the base station. After receiving the subcarrier spacing configuration information, the terminal feeds back a preamble to the base station, and the base station obtains the quantized value of the timing advance corresponding to the tracking area based on the preamble, and transmits the quantized value to the terminal, so that the terminal determines the target timing advance based on the obtained quantized value of the timing advance and the subcarrier spacing configuration information, and performs uplink timing adjustment. Under the condition that the signaling overhead is unchanged, the uplink timing advancement indication is effectively realized, and the 5G NR random access mechanism can adjust the quantization unit of the timing advance based on the uplink carrier spacing to achieve uplink orthogonality. The method also supports the maximum cell radius supported by all current NR preamble sequences.

Figure 3:
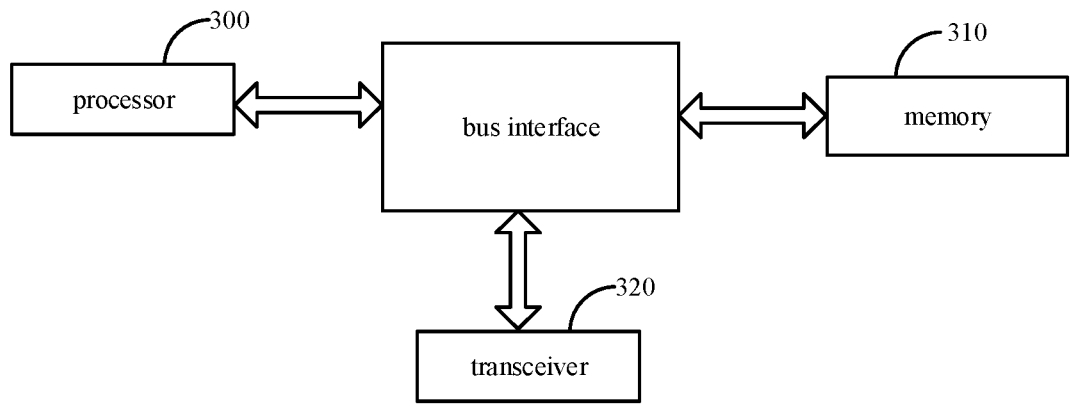
FIG. 3 is a schematic view showing a base station based on one embodiment of the present disclosure.

As shown in FIG. 3, an embodiment of the present disclosure further provides a base station, including: a transceiver 320, a memory 310, a processor 300, and a program stored on the memory 310 and executable on the processor 300. The processor 300 is configured to read a program in the memory 310, and the transceiver 320 is configured to perform the following processes: transmitting subcarrier spacing configuration information of a physical uplink shared channel (PUSCH) and/or a physical uplink control channel (PUCCH) to a terminal; receiving a preamble fed back by the terminal based on subcarrier spacing configuration information. The processor 300 is configured to perform the following process: obtaining a quantized value of a timing advance corresponding to a tracking area based on the preamble. The transceiver 320 is further configured to perform the following process: transmitting a quantized value of the timing advance to the terminal.

Optionally, the processor 300 is further configured to execute the following processes: estimating a reference timing advance corresponding to the tracking area based on a preamble of a physical random access channel PRACH transmitted by the terminal; obtaining a quantized value of the timing advance based on the reference timing advance and the subcarrier spacing configuration information.

Optionally, the processor 300 is further configured to execute the following processes: obtaining a time quantization unit of a timing advance is obtained based on the subcarrier spacing configuration information; and obtaining a quantized value of the timing advance based on the reference timing advance and the time quantization unit of the timing advance.

Optionally, the processor 300 is further configured to execute the following processes: configuring one or more timing advance groups for the terminal, each of the timing advance groups including one or more component carriers configured for the terminal; obtaining the time quantization unit of the timing advance corresponding to the timing advance group based on the subcarrier spacing configuration information of an uplink bandwidth portion of one or more component carriers included in the timing advance group.

Optionally, the processor 300 is further configured to execute the following processes: obtaining the maximum value of the subcarrier spacing of all PUSCHs and/or PUCCHs of uplink bandwidth portions of all component carriers included in the timing advance group based on subcarrier spacing configuration information of uplink bandwidth portions of one or more component carriers included in the timing advance group; and obtaining a time quantization unit of a timing advance corresponding to the timing advance group based on the maximum value of the subcarrier spacing.

Optionally, the processor 300 is further configured to execute the following processes: obtaining the maximum value of the subcarrier spacing of all PUSCH and/or PUCCH of all activated uplink bandwidth parts of all component carriers included in the timing advance group based on subcarrier spacing configuration information of an uplink bandwidth part of one or more component carriers included in the timing advance group; and obtaining a time quantization unit of the timing advance corresponding to the timing advance group based on the maximum value of the subcarrier spacing.

Optionally, the processor 300 is further configured to execute the following processes: searching a time quantization unit N of the timing advance corresponding to the maximum value S of the subcarrier spacing in a preconfigured correspondence between the subcarrier spacing in the spacing configuration information and the time quantization unit of the timing advance.

Optionally, the processor 300 is further configured to execute the following processes: determining a target conversion value M based on a ratio of the reference timing advance T to a sampling spacing; and determining a quantization value K of the timing advance based on the target conversion value M and a time quantization unit N of the timing advance.

Optionally, the processor 300 is further configured to execute the following processes: obtaining a quantized value K of the timing advance by using the first preset formula K=M/N.

Optionally, the transceiver 320 is further configured to perform the following processes: transmitting the random access response message carrying the quantized value of the timing advance to the terminal.

In summary, in the foregoing base station based on the embodiment of the present disclosure, the base station transmits subcarrier spacing configuration information to the terminal. After receiving the subcarrier spacing configuration information, the terminal feeds back a preamble to the base station, and the base station obtains the quantized value of the timing advance corresponding to the tracking area based on the preamble, and transmits the quantized value to the terminal, so that the terminal determines the target timing advance based on the obtained quantized value of the timing advance and the subcarrier spacing configuration information, and performs uplink timing adjustment. Under the condition that the signaling overhead is unchanged, the uplink timing advancement indication is effectively realized, and the 5G NR random access mechanism can adjust the quantization unit of the timing advance based on the uplink carrier spacing to achieve uplink orthogonality. The method also supports the maximum cell radius supported by all current NR preamble sequences.

It should be noted that, the base stations provided in the embodiments of the present disclosure are base stations capable of performing the foregoing timing advance indication method, so all embodiments of the foregoing timing advance indication method are applicable to the base station, and all can achieve the same or similar beneficial effects.

An embodiment of the present disclosure further provides a computer-readable storage medium, where a program is stored on the computer-readable storage medium, and when the program is executed by a processor, each step in the foregoing timing advance indication method is implemented, the same technical effects are achieved. In order to avoid repetition, it will not repeated herein. The computer-readable storage medium may be a read-only memory (ROM), a random access memory (RAM), a magnetic disk, or an optical disk.

Figure 4:
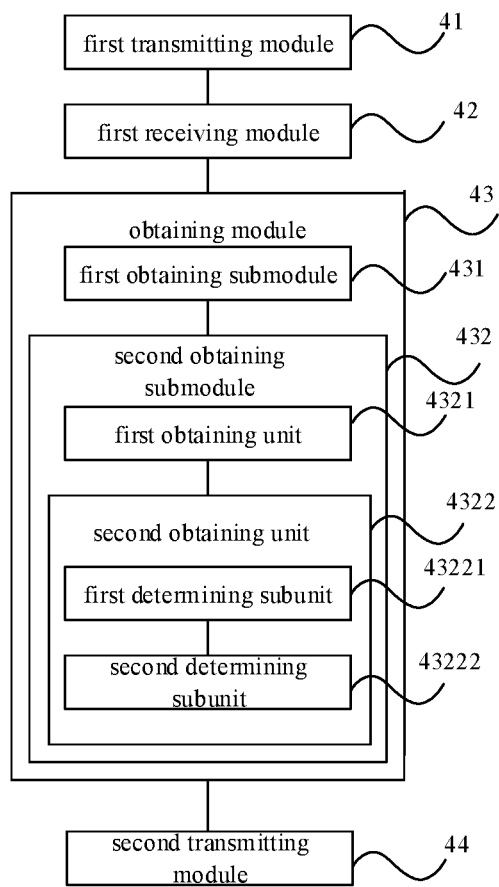
FIG. 4 is a schematic view of a timing advance indication device based on one embodiment of the present disclosure.

As shown in FIG. 4, an embodiment of the present disclosure further provides a timing advance indication device, which is applied to a base station and includes: a first transmitting module 41, configured to transmit subcarrier spacing configuration information of a physical uplink shared channel (PUSCH) and/or a physical uplink control channel (PUCCH) to a terminal; a first receiving module 42 configured to receive a preamble fed back by the terminal based on subcarrier spacing configuration information; an obtaining module 43, configured to obtain a quantized value of a timing advance corresponding to a tracking area based on the preamble; a second transmitting module 44, configured to transmit a quantized value of the timing advance to the terminal.

Optionally, the obtaining module 43 includes: a first obtaining submodule 431, configured to perform estimation on a preamble of a physical random access channel PRACH transmitted by the terminal and obtain a reference timing advance corresponding to the tracking area; and a second obtaining submodule 432, configured to obtain a quantized value of the timing advance based on the reference timing advance and the subcarrier spacing configuration information.

Optionally, the second obtaining submodule 432 includes: a first obtaining unit 4321, configured to obtain a time quantization unit of a timing advance is obtained based on the subcarrier spacing configuration information; and a second obtaining unit 4322, configured to obtain a quantized value of the timing advance based on the reference timing advance and the time quantization unit of the timing advance.

Optionally, the base station further includes: a configuration module, configured to configure one or more timing advance groups for the terminal, each of the timing advance groups including one or more component carriers configured for the terminal.

The first obtaining unit 4321 is further configured to: obtain the time quantization unit of the timing advance corresponding to the timing advance group based on the subcarrier spacing configuration information of an uplink bandwidth portion of one or more component carriers included in the timing advance group.

Optionally, the first obtaining unit 4321 is further configured to: obtain the maximum value of the subcarrier spacing of all PUSCHs and/or PUCCHs of uplink bandwidth portions of all component carriers included in the timing advance group based on subcarrier spacing configuration information of uplink bandwidth portions of one or more component carriers included in the timing advance group; and obtain a time quantization unit of a timing advance corresponding to the timing advance group based on the maximum value of the subcarrier spacing.

Optionally, the first obtaining unit 4321 is further configured to: obtain the maximum value of the subcarrier spacing of all PUSCH and/or PUCCH of all activated uplink bandwidth parts of all component carriers included in the timing advance group based on subcarrier spacing configuration information of an uplink bandwidth part of one or more component carriers included in the timing advance group; and obtain a time quantization unit of the timing advance corresponding to the timing advance group based on the maximum value of the subcarrier spacing.

Optionally, the first obtaining unit 4321 is further configured to: search a time quantization unit N of the timing advance corresponding to the maximum value S of the subcarrier spacing in a preconfigured correspondence between the subcarrier spacing in the spacing configuration information and the time quantization unit of the timing advance.

Optionally, the second obtaining unit 4322 includes: a first determining subunit 43221, configured to determine a target conversion value M based on a ratio of the reference timing advance T to a sampling spacing; and a second determining subunit 43222, configured to determine a quantization value K of the timing advance based on the target conversion value M and a time quantization unit N of the timing advance.

Optionally, the second determining subunit 43222 is further configured to: obtain a quantized value K of the timing advance by using the first preset formula K=M/N.

Optionally, the second transmitting module 44 is further configured to: transmitting the random access response message carrying the quantized value of the timing advance to the terminal.

In summary, in the foregoing base station based on the embodiment of the present disclosure, the base station transmits subcarrier spacing configuration information to the terminal. After receiving the subcarrier spacing configuration information, the terminal feeds back a preamble to the base station, and the base station obtains the quantized value of the timing advance corresponding to the tracking area based on the preamble, and transmits the quantized value to the terminal, so that the terminal determines the target timing advance based on the obtained quantized value of the timing advance and the subcarrier spacing configuration information, and performs uplink timing adjustment. Under the condition that the signaling overhead is unchanged, the uplink timing advancement indication is effectively realized, and the 5G NR random access mechanism can adjust the quantization unit of the timing advance based on the uplink carrier spacing to achieve uplink orthogonality. The method also supports the maximum cell radius supported by all current NR preamble sequences.

It should be noted that the timing advance indication device provided by the embodiment of the present disclosure is a device capable of executing the foregoing timing advance indication method, and all the embodiments of the foregoing timing advance indication method are applicable to the device, and the same or similar beneficial effects are achieved.

Figure 5:
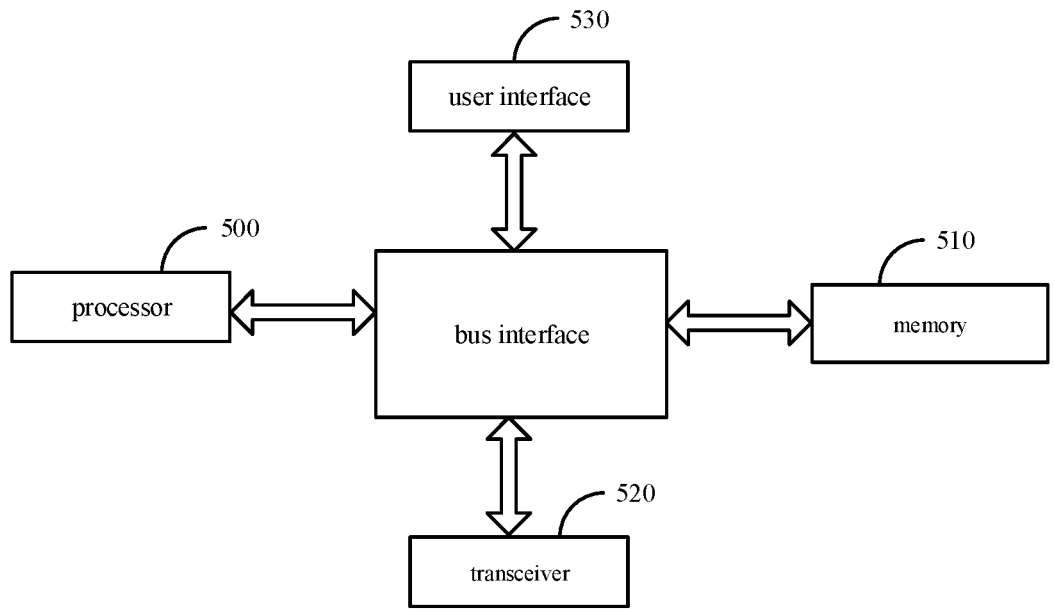
FIG. 5 is a schematic view showing a UE based on one embodiment of the present disclosure.

As shown in FIG. 5, an embodiment of the present disclosure further provides a terminal, including: a transceiver 520, a memory 510, a processor 500, and a program stored on the memory 510 and executable on the processor 500. The terminal further includes a user interface 530, the processor 500 is configured to read a program in the memory 510, and the transceiver 520 is configured to perform the following processes: receiving subcarrier spacing configuration information of a physical uplink shared channel (PUSCH) and/or a physical uplink control channel (PUCCH) transmitted by a base station; feeding back a preamble to the base station based on the subcarrier spacing configuration information; and receiving a quantized value of a timing advance corresponding to a tracking area obtained based on a preamble and transmitted by a base station.

The processor 500 is configured to perform a process of determining a target timing advance based on the quantized value of the timing advance and the subcarrier spacing configuration information, and performing uplink timing adjustment.

Optionally, the transceiver 520 is further configured to: feed back the preamble of the physical random access channel PRACH to the base station based on the received subcarrier spacing configuration information.

Optionally, the transceiver 520 is further configured to: receive a random access response message carrying a quantized value of the timing advance transmitted by the base station, and obtaining the quantized value of the timing advance.

Optionally, the processor 500 is further configured to perform the following processes: obtaining the time quantization unit N of the timing advance based on the subcarrier spacing configuration information; determining the target timing advance F based on the time quantization unit N of the timing advance and the quantized value K of the timing advance; and performing uplink timing adjustment based on the target timing advance.

Optionally, the processor 500 is further configured to perform the following processes: determining one or more timing advance groups configured by the base station for the terminal; wherein each of the timing advance groups includes: one or more component carriers configured for the terminal; obtaining the time quantization unit N of the timing advance corresponding to the timing advance group based on the subcarrier spacing configuration information of an uplink bandwidth portion of one or more component carriers included in the timing advance group.

Optionally, the processor 500 is further configured to perform the following processes: obtaining the maximum value of the subcarrier spacing of all PUSCHs and/or PUCCHs of uplink bandwidth portions of all component carriers included in the timing advance group based on subcarrier spacing configuration information of uplink bandwidth portions of one or more component carriers included in the timing advance group; and obtaining a time quantization unit N of a timing advance corresponding to the timing advance group based on the maximum value of the subcarrier spacing.

Optionally, the processor 500 is further configured to perform the following processes: obtaining the maximum value of the subcarrier spacing of all PUSCH and/or PUCCH of all activated uplink bandwidth parts of all component carriers included in the timing advance group based on subcarrier spacing configuration information of an uplink bandwidth part of one or more component carriers included in the timing advance group; and obtaining a time quantization unit N of the timing advance corresponding to the timing advance group based on the maximum value of the subcarrier spacing.

Optionally, the processor 500 is further configured to perform the following processes: searching a time quantization unit N of the timing advance corresponding to the maximum value S of the subcarrier spacing in a preconfigured correspondence between the subcarrier spacing in the spacing configuration information and the time quantization unit of the timing advance.

Optionally, the processor 500 is further configured to perform the following processes: obtaining a target timing advance F by using a second preset formula F=N*K.

In summary, in the foregoing terminal based on the embodiment of the present disclosure, the terminal receives subcarrier spacing configuration information from the base station. After receiving the subcarrier spacing configuration information, the terminal feeds back a preamble to the base station, and the base station obtains the quantized value of the timing advance corresponding to the tracking area based on the preamble, and transmits the quantized value to the terminal, so that the terminal determines the target timing advance based on the obtained quantized value of the timing advance and the subcarrier spacing configuration information, and performs uplink timing adjustment. Under the condition that the signaling overhead is unchanged, the uplink timing advancement indication is effectively realized, and the 5G NR random access mechanism can adjust the quantization unit of the timing advance based on the uplink carrier spacing to achieve uplink orthogonality. The method also supports the maximum cell radius supported by all current NR preamble sequences. It should be noted that, the terminal provided in the embodiments of the present disclosure are terminals capable of performing the foregoing timing advance indication method, so all embodiments of the foregoing timing advance indication method are applicable to the terminal, and all can achieve the same or similar beneficial effects.

An embodiment of the present disclosure further provides a computer-readable storage medium, where a program is stored on the computer-readable storage medium, and when the program is executed by a processor, each step in the foregoing timing advance indication method is implemented, the same technical effects are achieved. In order to avoid repetition, it will not repeated herein. The computer-readable storage medium may be a read-only memory (ROM), a random access memory (RAM), a magnetic disk, or an optical disk.

Figure 6:
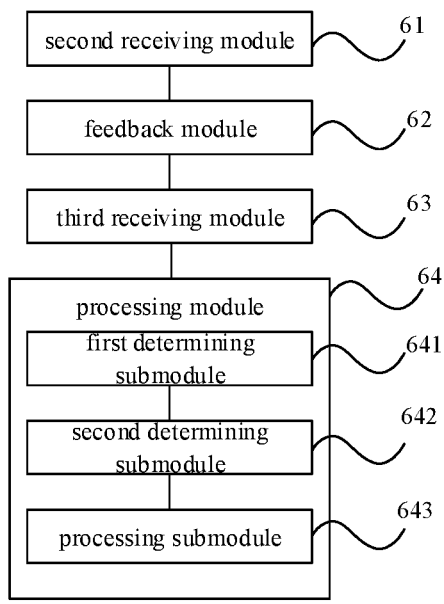
FIG. 6 is another schematic view of a timing advance indication device based on one embodiment of the present disclosure.

As shown in FIG. 6, an embodiment of the present disclosure further provides a timing advance indication device, which is applied to a terminal. The device includes: a second receiving module 61, configured to receive subcarrier spacing configuration information of a physical uplink shared channel (PUSCH) and/or a physical uplink control channel (PUCCH) transmitted by a base station; a feedback module 62, configured to feed back a preamble to the base station based on the subcarrier spacing configuration information; a third receiving module 63, configured to receive a quantized value of a timing advance corresponding to a tracking area obtained based on a preamble and transmitted by a base station; and a processing module 64, configured to determine a target timing advance based on the quantized value of the timing advance and the subcarrier spacing configuration information, and performing uplink timing adjustment.

Optionally, the feedback module 62 is further configured to: feed back the preamble of the physical random access channel PRACH to the base station based on the received subcarrier spacing configuration information.

Optionally, the third receiving module 63 is further configured to: receive a random access response message carrying a quantized value of the timing advance transmitted by the base station, and obtaining the quantized value of the timing advance.

Optionally, the processing module 64 includes: a first determining submodule 641, configured to obtain the time quantization unit N of the timing advance based on the subcarrier spacing configuration information; a second determining submodule 642, configured to the target timing advance F based on the time quantization unit N of the timing advance and the quantized value K of the timing advance; and a processing submodule 643, configured to perform uplink timing adjustment based on the target timing advance F.

Optionally, the first determining sub-module 641 is further configured to: determine one or more timing advance groups configured by the base station for the terminal; wherein each of the timing advance groups includes: one or more component carriers configured for the terminal; obtain the time quantization unit N of the timing advance corresponding to the timing advance group based on the subcarrier spacing configuration information of an uplink bandwidth portion of one or more component carriers included in the timing advance group.

Optionally, the first determining sub-module 641 is further configured to: obtain the maximum value of the subcarrier spacing of all PUSCHs and/or PUCCHs of uplink bandwidth portions of all component carriers included in the timing advance group based on subcarrier spacing configuration information of uplink bandwidth portions of one or more component carriers included in the timing advance group; and obtain a time quantization unit N of a timing advance corresponding to the timing advance group based on the maximum value of the subcarrier spacing.

Optionally, the first determining sub-module 641 is further configured to: obtain the maximum value of the subcarrier spacing of all PUSCH and/or PUCCH of all activated uplink bandwidth parts of all component carriers included in the timing advance group based on subcarrier spacing configuration information of an uplink bandwidth part of one or more component carriers included in the timing advance group; and obtain a time quantization unit N of the timing advance corresponding to the timing advance group based on the maximum value of the subcarrier spacing.

Optionally, the first determining sub-module 641 is further configured to: search a time quantization unit N of the timing advance corresponding to the maximum value S of the subcarrier spacing in a preconfigured correspondence between the subcarrier spacing in the spacing configuration information and the time quantization unit of the timing advance.

Optionally, the second determining sub-module 642 is further configured to: obtain a target timing advance F by using a second preset formula F=N*K.

In summary, in the foregoing timing advance indication device in the embodiment of the present disclosure, the terminal receives subcarrier spacing configuration information from the base station. After receiving the subcarrier spacing configuration information, the terminal feeds back a preamble to the base station, and the base station obtains the quantized value of the timing advance corresponding to the tracking area based on the preamble, and transmits the quantized value to the terminal, so that the terminal determines the target timing advance based on the obtained quantized value of the timing advance and the subcarrier spacing configuration information, and performs uplink timing adjustment. Under the condition that the signaling overhead is unchanged, the uplink timing advancement indication is effectively realized, and the 5G NR random access mechanism can adjust the quantization unit of the timing advance based on the uplink carrier spacing to achieve uplink orthogonality. The method also supports the maximum cell radius supported by all current NR preamble sequences. It should be noted that, the device provided in the embodiments of the present disclosure are device capable of performing the foregoing timing advance indication method, so all embodiments of the foregoing timing advance indication method are applicable to the terminal, and all can achieve the same or similar beneficial effects.

Those skilled in the art should understand that the embodiments of the present application may be provided as a method, a system, or a computer program product. Therefore, this application may take the form of an embodiment of entirely hardware, entirely software, or a combination of software and hardware. Moreover, the present application may take the form of a computer program product implemented on one or more computer-readable storage media (including, but not limited to, magnetic disk memory, optical memory, etc.) containing computer-usable program codes.

This application is described with reference to flowcharts and/or block diagrams of methods, devices (systems) and computer program products based on embodiments of the present application. It should be understood that each process and/or block in the flowcharts and/or block diagrams, and combinations of processes and/or blocks in the flowcharts and/or block diagrams can be implemented by computer program instructions. These computer program instructions may be provided to a processor of a generalpurpose computer, special-purpose computer, embedded processor, or other programmable data processing device to produce a machine, so that instructions generated by the processor of the computer or other programmable data processing device may be used to implement the functions specified in one or more processes and/or one or more blocks of the flowchart.

These computer program instructions may also be stored in a computer-readable storage medium capable of directing a computer or other programmable data processing device to work in a particular manner such that the instructions stored in the computer-readable storage medium produce a paper product including the instructions. The instruction device implements the functions specified in one or more flowcharts and/or one or more blocks of the block diagram.

These computer program instructions can also be loaded onto a computer or other programmable data processing device, so that the computer or other programmable device performs a series of operational steps to produce a computer-implemented process, and thus the instructions executed on the computer or other programming device provides steps for implementing the functions specified in one or more flowcharts and/or one or more blocks of the block diagrams.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A timing advance indication method applied for a base station, comprising:
    transmitting subcarrier spacing configuration information of a physical uplink shared channel (PUSCH) and/or a physical uplink control channel (PUCCH) to a terminal;
    receiving a preamble fed back by the terminal based on the subcarrier spacing configuration information;
    obtaining a quantized value of a timing advance corresponding to a tracking area based on the preamble; and
    transmitting the quantized value of the timing advance to the terminal;
    wherein the obtaining the quantized value of the timing advance corresponding to the tracking area based on the preamble comprises:
    estimating a reference timing advance corresponding to the tracking area based on the preamble of a physical random access channel (PRACH) transmitted by the terminal; and
    obtaining the quantized value of the timing advance based on the reference timing advance and the subcarrier spacing configuration information;
    wherein the obtaining the quantized value of the timing advance based on the reference timing advance and the subcarrier spacing configuration information comprises:
    obtaining a time quantization unit of the timing advance based on the subcarrier spacing configuration information; and
    obtaining the quantized value of the timing advance based on the reference timing advance and the time quantization unit of the timing advance;
    wherein before the obtaining a time quantization unit of the timing advance based on the subcarrier spacing configuration information, the method further comprises:
    configuring one or more timing advance groups for the terminal, each of the timing advance groups including one or more component carriers configured for the terminal;
    the obtaining a time quantization unit of the timing advance based on the subcarrier spacing configuration information comprises:
    obtaining the time quantization unit of the timing advance corresponding to each of the timing advance groups based on the subcarrier spacing configuration information of uplink bandwidth portions of one or more component carriers included in each of the timing advance groups;
    wherein the obtaining the time quantization unit of the timing advance corresponding to each of the timing advance groups based on the subcarrier spacing configuration information of uplink bandwidth portions of one or more component carriers included in each of the timing advance groups comprises:
    obtaining a maximum value of subcarrier spacing of all PUSCHs and/or PUCCHs of uplink bandwidth portions of all component carriers included in each of the timing advance groups based on subcarrier spacing configuration information of uplink bandwidth portions of one or more component carriers included in each of the timing advance groups; and
    obtaining the time quantization unit of the timing advance corresponding to each of the timing advance groups based on the maximum value of the subcarrier spacing;
    or,
    wherein the obtaining the time quantization unit of the timing advance corresponding to each of the timing advance groups based on the subcarrier spacing configuration information of uplink bandwidth portions of one or more component carriers included in each of the timing advance groups comprises:
    obtaining a maximum value of the subcarrier spacing of all PUSCH and/or PUCCH of all activated uplink bandwidth parts of all component carriers included in each of the timing advance groups based on subcarrier spacing configuration information of uplink bandwidth parts of one or more component carriers included in each of the timing advance groups; and
    obtaining the time quantization unit of the timing advance corresponding to each of the timing advance groups is obtained based on the maximum value of the subcarrier spacing.

2. The timing advance indication method according to claim 1, wherein the obtaining the time quantization unit of the timing advance corresponding to the timing advance group based on the maximum value of the subcarrier spacing comprises:
    searching for a time quantization unit N of timing advance corresponding to the maximum value S of the subcarrier spacing in a preconfigured correspondence between the subcarrier spacing in the subcarrier spacing configuration information and the time quantization unit N of the timing advance.

3. The timing advance indication method according to claim 1, wherein the transmitting the quantized value of the timing advance to the terminal comprises:
    transmitting a random access response message carrying the quantized value of the timing advance to the terminal.

4. A base station, comprising a transceiver, a memory, a processor, and a program stored on the memory and executable on the processor, wherein the processor is configured to read the program stored on the memory, and the transceiver is configured to implement the timing advance indication method according to claim 1.

5. The base station according to claim 4, wherein the processor is further configured to:
  search a time quantization unit N of timing advance corresponding to the maximum value S of the subcarrier spacing in a preconfigured correspondence between the subcarrier spacing in the subcarrier spacing configuration information and the time quantization unit N of the timing advance.

6. The base station according to claim 4, wherein the processor is further configured to:
  transmit a random access response message carrying the quantized value of the timing advance to the terminal.

7. A timing advance indication method applied for a base station, comprising:
  transmitting subcarrier spacing configuration information of a physical uplink shared channel (PUSCH) and/or a physical uplink control channel (PUCCH) to a terminal;
  receiving a preamble fed back by the terminal based on the subcarrier spacing configuration information;
  obtaining a quantized value of a timing advance corresponding to a tracking area based on the preamble; and
  transmitting the quantized value of the timing advance to the terminal;
  wherein the obtaining the quantized value of the timing advance corresponding to the tracking area based on the preamble comprises:
  estimating a reference timing advance corresponding to the tracking area based on the preamble of a physical random access channel (PRACH) transmitted by the terminal; and
  obtaining the quantized value of the timing advance based on the reference timing advance and the subcarrier spacing configuration information;
  wherein the obtaining the quantized value of the timing advance based on the reference timing advance and the subcarrier spacing configuration information comprises:
  obtaining a time quantization unit of the timing advance based on the subcarrier spacing configuration information; and
  obtaining the quantized value of the timing advance based on the reference timing advance and the time quantization unit of the timing advance;
  wherein the obtaining the quantized value of the timing advance based on the reference timing advance and the time quantization unit of the timing advance comprises:
  determining a target conversion value M based on a ratio of the reference timing advance T to a sampling spacing; and
  determining the quantized value K of the timing advance based on the target conversion value M and the time quantization unit N of the timing advance.

8. The timing advance indication method according to claim 7, wherein the determining the quantization value K of the timing advance based on the target conversion value M and the time quantization unit N of the timing advance comprises:
  obtaining the quantized value K of the timing advance by using a first preset formula K=M/N.

9. A base station, comprising a transceiver, a memory, a processor, and a program stored on the memory and executable on the processor, wherein the processor is configured to read the program stored on the memory, and the transceiver is configured to implement the timing advance indication method according to claim 7.

10. The base station according to claim 9, wherein the processor is further configured to:
  obtain the quantized value K of the timing advance by using a first preset formula K=M/N.

11. A timing advance indication method applied to a terminal, comprising:
  receiving subcarrier spacing configuration information of a physical uplink shared channel (PUSCH) and/or a physical uplink control channel (PUCCH) transmitted by a base station;
  feeding back a preamble to the base station based on the subcarrier spacing configuration information;
  receiving a quantized value of a timing advance corresponding to a tracking area obtained based on the preamble and transmitted by a base station; and
  determining a target timing advance based on the quantized value of the timing advance and the subcarrier spacing configuration information, and performing uplink timing adjustment;
  wherein the determining the target timing advance based on the quantized value of the timing advance and the subcarrier spacing configuration information and performing uplink timing adjustment comprises:
  obtaining a time quantization unit N of the timing advance based on the subcarrier spacing configuration information;
  determining a target timing advance F based on the time quantization unit N of the timing advance and the quantized value K of the timing advance; and
  performing uplink timing adjustment based on the target timing advance F;
  wherein before the obtaining the time quantization unit N of the timing advance based on the subcarrier spacing configuration information, the method further comprises: determining one or more timing advance groups configured by the base station for the terminal; wherein each of the timing advance groups comprises one or more component carriers configured for the terminal;
  the obtaining the time quantization unit N of the timing advance based on the subcarrier spacing configuration information comprises: obtaining the time quantization unit N of the timing advance corresponding to each of the timing advance groups based on the subcarrier spacing configuration information of uplink bandwidth portions of one or more component carriers included in each of the timing advance groups;
  wherein the obtaining the time quantization unit N of the timing advance corresponding to each of the timing advance groups based on the subcarrier spacing configuration information of uplink bandwidth portions of one or more component carriers included in each of the timing advance groups comprises:
  obtaining a maximum value of subcarrier spacing of all PUSCHs and/or PUCCHs of uplink bandwidth portions of all component carriers included in each of the timing advance groups based on subcarrier spacing configuration information of uplink bandwidth portions of one or more component carriers included in each of the timing advance groups; and obtaining the time quantization unit N of the timing advance corresponding to each of the timing advance groups based on the maximum value of the subcarrier spacing;

or, wherein the obtaining the time quantization unit N of the timing advance corresponding to each of the timing advance groups based on the subcarrier spacing configuration information of uplink bandwidth portions of one or more component carriers included in each of the timing advance groups comprises:

obtaining a maximum value of the subcarrier spacing of all PUSCH and/or PUCCH of all activated uplink bandwidth parts of all component carriers included in each of the timing advance groups based on subcarrier spacing configuration information of uplink bandwidth parts of one or more component carriers included in each of the timing advance groups; and obtaining the time quantization unit of the timing advance corresponding to each of the timing advance groups is obtained based on the maximum value of the subcarrier spacing.

12. The timing advance indication method according to claim 11, wherein the feeding back the preamble to the base station based on the subcarrier spacing configuration information comprises:

feeding back the preamble of the physical random access channel (PRACH) to the base station based on received subcarrier spacing configuration information.

13. The timing advance indication method according to claim 11, wherein the receiving the quantized value of the timing advance corresponding to the tracking area obtained based on the preamble transmitted by the base station comprises:

receiving a random access response message carrying the quantized value of the timing advance transmitted by the base station, and obtaining the quantized value of the timing advance.

14. The timing advance indication method according to claim 11, wherein the obtaining the time quantization unit of the timing advance corresponding to the timing advance group based on the maximum value of the subcarrier spacing comprises:

searching for a time quantization unit N of timing advance corresponding to the maximum value S of the subcarrier spacing in a preconfigured correspondence between the subcarrier spacing in the subcarrier spacing configuration information and the time quantization unit of the timing advance.

15. A terminal, comprising a transceiver, a memory, a processor, and a program stored on the memory and executable on the processor, wherein the processor is configured to read the program stored on the memory, and the transceiver is configured to implement the timing advance indication method according to claim 11.

16. The terminal according to claim 15, wherein the transceiver is further configured to:

feedback the preamble of the physical random access channel (PRACH) to the base station based on received subcarrier spacing configuration information.

17. The terminal according to claim 15, wherein the transceiver is further configured to:

receive a random access response message carrying the quantized value of the timing advance transmitted by the base station, and obtaining the quantized value of the timing advance.

18. The terminal according to claim 15, wherein the processor is further configured to:

search a time quantization unit N of timing advance corresponding to the maximum value S of the subcarrier spacing in a preconfigured correspondence between the subcarrier spacing in the subcarrier spacing configuration information and the time quantization unit of the timing advance.

* * * * *